United States Patent
Doraiswamy et al.

(10) Patent No.: US 10,230,798 B2
(45) Date of Patent: *Mar. 12, 2019

(54) DISTRIBUTED EDGE PROCESSING OF INTERNET OF THINGS DEVICE DATA IN CO-LOCATION FACILITIES

(71) Applicant: EQUINIX, Inc., Redwood City, CA (US)

(72) Inventors: Vijaay Doraiswamy, Fremont, CA (US); Brian J. Lillie, Los Altos, CA (US); Ramchandra Jayateerth Koty, Sunnyvale, CA (US); Jaganathan Jeyapaul, Saratoga, CA (US); Purvish Purohit, Sunnyvale, CA (US)

(73) Assignee: Equinix, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/863,565

(22) Filed: Jan. 5, 2018

(65) Prior Publication Data

US 2018/0131770 A1 May 10, 2018

Related U.S. Application Data

(63) Continuation of application No. 15/394,144, filed on Dec. 29, 2016, now Pat. No. 9,866,637.
(Continued)

(51) Int. Cl.
*G06F 15/177* (2006.01)
*H04L 29/08* (2006.01)
(Continued)

(52) U.S. Cl.
CPC ........ *H04L 67/125* (2013.01); *H04L 41/0806* (2013.01); *H04L 67/1021* (2013.01);
(Continued)

(58) Field of Classification Search
USPC ....... 709/223, 203, 206, 217, 219, 222, 224, 709/226, 228, 230, 232; 370/264, 328
See application file for complete search history.

(56) References Cited

U.S. PATENT DOCUMENTS 7,310,664 B1  12/2007  Merchant et al.
7,609,619 B2  10/2009  Naseh et al.
(Continued)

FOREIGN PATENT DOCUMENTS

EP   1411456 A2    10/2003
WO   2017123674 A1  7/2017

OTHER PUBLICATIONS

"Wherever You Are Access Your Data," OSIsoft, osisoft.com, 2015, 44 pp. (Applicant points out, in accordance with MPEP 609.04(a), that the year of publication, 2015, is sufficiently earlier than the effective U.S. filing date, Jan. 11, 2016, so that the particular month of publication is not in issue.).
(Continued)

*Primary Examiner* — Quang N Nguyen
(74) *Attorney, Agent, or Firm* — Shumaker & Sieffert, P.A.

(57) ABSTRACT

Techniques are described for distributed processing of Internet of Things (IoT) device data by edge systems co-located within a globally-distributed set of co-location facilities deployed and managed by a co-location facility provider. For example, a method includes selecting, by at least one of a plurality of edge computing systems co-located within respective co-location facilities each deployed and managed by a single co-location facility provider, a selected edge computing system of the plurality of edge computing systems to process data associated with events generated by an IoT device. The method also includes provisioning, at the selected edge computing system, an application programming interface (API) endpoint for communication with the
(Continued)

IoT device, receiving, by the selected edge computing system at the endpoint, the data associated with the events generated by the IoT device, and processing, by the selected edge computing system, the data associated with the events generated by the IoT device.

16 Claims, 12 Drawing Sheets

Related U.S. Application Data

(60) Provisional application No. 62/277,038, filed on Jan. 11, 2016.

(51) Int. Cl.
   *H04L 12/24* (2006.01)
   *H04L 29/06* (2006.01)
   *H04W 4/38* (2018.01)

(52) U.S. Cl.
   CPC .......... *H04L 67/2804* (2013.01); *H04L 69/08* (2013.01); *H04W 4/38* (2018.02)

(56) References Cited

U.S. PATENT DOCUMENTS

| | | | |
|---|---|---|---|
| 7,801,994 B2 | 9/2010 | Kudo | |
| 7,830,894 B2 * | 11/2010 | Bouat | H04W 84/08 370/264 |
| 7,853,953 B2 | 12/2010 | Devarakonda et al. | |
| 8,737,357 B2 * | 5/2014 | Denny | H04W 24/04 370/328 |
| 8,738,753 B2 | 5/2014 | Devraj et al. | |
| 8,849,995 B1 | 9/2014 | Gabrielson et al. | |
| 8,990,639 B1 | 3/2015 | Marr et al. | |
| 9,037,712 B2 | 5/2015 | Rafiq et al. | |
| 9,098,345 B2 | 8/2015 | Jones et al. | |
| 9,165,120 B1 | 10/2015 | Brandwine et al. | |
| 9,176,483 B2 | 11/2015 | Bentivegna et al. | |
| 9,350,703 B2 * | 5/2016 | Murthy | H04L 63/20 |
| 9,385,926 B2 | 7/2016 | Leung | |
| 9,426,030 B1 | 8/2016 | Anerousis | |
| 9,519,517 B2 | 12/2016 | Dalgas et al. | |
| 9,571,588 B2 | 2/2017 | Duffy et al. | |
| 9,590,876 B2 | 3/2017 | Purusothaman | |
| 9,600,494 B2 * | 3/2017 | Maluf | G06T 7/30 |
| 9,634,893 B2 | 4/2017 | Boutros et al. | |
| 9,712,486 B2 | 7/2017 | Johnson et al. | |
| 9,729,411 B2 | 8/2017 | Purusothaman | |
| 9,762,438 B2 | 9/2017 | Anerousis | |
| 9,806,954 B2 | 10/2017 | Gundogola et al. | |
| 9,824,327 B2 | 11/2017 | Cartwright et al. | |
| 9,838,454 B2 | 12/2017 | Subramanian et al. | |
| 9,866,637 B2 | 1/2018 | Doraiswamy et al. | |
| 9,886,267 B2 | 2/2018 | Maheshwari et al. | |
| 9,948,521 B2 | 4/2018 | Doraiswamy et al. | |
| 9,948,522 B2 | 4/2018 | Marinelli et al. | |
| 9,948,552 B2 | 4/2018 | Teng et al. | |
| 2008/0133729 A1 * | 6/2008 | Fridman | H04L 41/0893 709/223 |
| 2009/0144338 A1 | 6/2009 | Feng et al. | |
| 2010/0057935 A1 | 3/2010 | Kawai et al. | |
| 2013/0094444 A1 * | 4/2013 | Lai | H04W 4/70 370/328 |
| 2014/0359131 A1 | 12/2014 | Seed et al. | |
| 2015/0156079 A1 | 6/2015 | Satterlee et al. | |
| 2015/0180544 A1 | 6/2015 | Morimoto et al. | |
| 2015/0207682 A1 | 7/2015 | Moraes Nichele et al. | |
| 2015/0312311 A1 | 10/2015 | Subramanian et al. | |
| 2016/0050116 A1 | 2/2016 | Sheshadri et al. | |
| 2016/0124742 A1 | 5/2016 | Rangasamy et al. | |
| 2016/0127254 A1 | 5/2016 | Kumar et al. | |
| 2016/0337473 A1 | 11/2016 | Rao | |
| 2016/0352588 A1 | 12/2016 | Subbarayan et al. | |
| 2017/0005515 A1 * | 1/2017 | Sanders | H02J 3/381 |
| 2017/0012941 A1 | 1/2017 | Subbarayan et al. | |
| 2017/0041248 A1 | 2/2017 | Toy | |
| 2017/0078241 A1 | 3/2017 | Zhang et al. | |
| 2017/0093958 A1 | 3/2017 | Huang | |
| 2017/0147424 A1 * | 5/2017 | Geiger | G06F 11/0706 |
| 2017/0200240 A1 | 7/2017 | Marinelli et al. | |
| 2017/0201413 A1 | 7/2017 | Marinelli et al. | |

OTHER PUBLICATIONS

International Search Report and Written Opinion of International Application No. PCT/US2016/69444, dated Mar. 24, 2017, 8 pp.
Prosecution History from U.S. Appl. No. 15/394,144, dated May 25, 2017 through Sep. 29, 2017, 36 pp.
Examination Report issued in Australian Application No. 2016386887 dated Jun. 28, 2018, 2 pp.
Response to Examination Report dated Jun. 28, 2018, from counterpart Australian Application No. 2016386887, filed Sep. 18, 2018, 1 pp.
International Preliminary Report on Patentability from International Application No. PCT/US2016/069444, dated Jul. 26, 2018, 6 pp.
Notice of Acceptance from counterpart Australian Application No. 2016386887, dated Oct. 9, 2018, 6 pp.
Extended European Search Report issued in European Application No. 16885437.0 dated Nov. 9, 2018, 10 pp.
Papageorgiou et al., "Reconstructability-aware Filtering and Forwarding of Time Series Data in Internet-of-Things Architecture," IEEE International Congress on Big Data, Jun. 27, 2015, pp. 576-583.
Beijar et al., "Gateway Selection in Capillary Networks," IEEE 5th International Conference on the Internet of Things (IoT), Oct. 26, 2015, pp. 90-97.
Nastic et al., "Provisioning Software-defined IoT Cloud Systems," IEEE International Conference on Future Internet of Things and Cloud, Aug. 27, 2014, pp. 288-295.
Ha, "Dynamic Intergration of Zigbee Home Networks into Home Gateways Using OSGi Service Registry," IEEE Transactions on Consumer Electronics, vol. 5, No. 2, May 2009, pp. 470-476.

* cited by examiner

DISTRIBUTED EDGE PROCESSING OF INTERNET OF THINGS DEVICE DATA IN CO-LOCATION FACILITIES

This application is a continuation of U.S. patent application 15/394,144, filed Dec. 29, 2016, now issued as U.S. Pat. No. 9,866,637, issued Jan. 9, 2018, which claims the benefit of U.S. Provisional Patent Application 62/277,038, filed Jan. 11, 2016, the entire content of each of which are incorporated herein by reference.

TECHNICAL FIELD

The disclosure relates to computer networks and, more specifically, to interconnecting computer networks.

BACKGROUND

A network services exchange provider or co-location provider (a "provider") may employ a communication facility, such as a data center or warehouse, in which multiple customers of the provider locate network, server, and storage gear and interconnect to a variety of telecommunications and other network service provider(s) with a minimum of cost and complexity. Data centers may be shared by the multiple tenants having their networking equipment located within the data centers. With Information Technology (IT) and communications facilities in safe, secure hands, telecommunications, Internet, application service providers, cloud service providers, content providers, and other providers, as well as enterprises, enjoy less latency and the freedom to focus on their core business. Additionally, customers may reduce their traffic back-haul costs and free up their internal networks for other uses.

In some cases, the communication facility provides interconnection services by which customers of the provider may interconnect to one another over the communication facility infrastructure or by which a customer of the provider may interconnect its spatially and/or geographically distributed customer networking equipment over the communication facility infrastructure. The communication facility may in such cases be referred to as an "interconnection facility" or "co-location facility."

Enterprises are increasingly making use of "smart" devices, i.e., physical objects that contain embedded technology configured to provide some degree of computing intelligence. These smart devices may communicate and sense or interact with their internal states or the external environment. The "Internet of Things" (IoT) refers to a network of these smart devices ("IoT devices"). The number of connected IoT devices is increasing exponentially, leading to various technology challenges for an enterprise attempting to integrate IoT implementations with the enterprise's centralized computing architecture for Information Technology (IT) systems and cloud ecosystem. These technology challenges may include scalability, performance, interoperability, security, and privacy, for example.

SUMMARY

In general, techniques are described for facilitating distributed processing of Internet of Things (IoT) device data by edge systems co-located within a globally-distributed set of co-location facilities deployed and managed by a co-location facility provider. This may improve the way IoT devices interact, integrate, and interconnect with an Information Technology (IT) cloud ecosystem, such as enterprise systems, hybrid clouds, applications, and the like. One or more "IoT edge" systems, located within co-location facilities that are geographically distributed across the globe, perform the distributed processing of IoT device data. The IoT edge systems operate at the Edge Computing and Connectivity layers of the IoT World Forum's IoT Reference Model (layers 3 and 2, respectively), and can help bridge the gap between operational technology (smart sensors, devices, machines, for example) and information technology (including enterprise systems, hybrid clouds, applications, for example).

In some examples, the IoT edge systems may filter data, received from IoT devices based on criteria specified by an enterprise associated with the IoT devices, to prevent IoT data not needed by the enterprise from being transmitted past the data center edge. The techniques of this disclosure may provide one or more advantages, such as in the areas of scalability, performance, interoperability, security, and privacy. For example, using distributed IoT edge systems to provide edge processing can reduce the amount of IoT device data being backhauled by enterprises to data centers, improving scalability. The reduction of data volume facilitated by the approach proposed herein may also lead to improved performance. Rather than geographically distributed IoT devices connecting to centralized computing architecture, the techniques of this disclosure uses IoT edge systems positioned within globally distributed, interconnected co-location facilities that can allow for more efficient connectivity with IoT devices vastly distributed across the globe. The techniques of this disclosure allow enterprises to dynamically provision the edge processing infrastructure of the IoT edge systems to flexibly handle IoT workloads, and provide the ability to filter noise generated by IoT devices at the data center edge. Performing the edge processing within a co-location data center can also allow for high speed and low latent connectivity to cloud/IT infrastructure.

The distributed IoT edge systems according to this disclosure may also provide benefits for interoperability. For example, the distributed IoT edge systems can provide protocol translation at the edge of the co-location facility to deal with the varied and multiple protocols used by IoT devices to communicate with cloud/IT infrastructure. The distributed IoT edge systems can help manage heterogeneous and non-standardized hardware/software platforms for IoT devices.

The distributed IoT edge systems according to this disclosure may also provide benefits for security and privacy. Security and privacy may be a challenge for IoT devices communicating with cloud/IT infrastructure because there may not be consensus on security standards to be implemented on IoT devices, which could lead to potential for unauthorized use of consumer/enterprise data. The distributed IoT edge systems provide a uniform mechanism for registration and authentication of IoT devices before the IoT devices can communicate with the cloud/IT infrastructure.

In one example, a method includes selecting, by at least one of a plurality of edge computing systems co-located within respective co-location facilities each deployed and managed by a single co-location facility provider, a selected edge computing system of the plurality of edge computing systems to process data generated by an Internet of Things (IoT) device, provisioning, at the selected edge computing system, an application programming interface (API) endpoint for communication with the IoT device, receiving, by the selected edge computing system at the API endpoint, the data generated by the IoT device, and processing, by the selected edge computing system, the data generated by the IoT device.

In another example, a system includes a plurality of edge computing systems co-located within respective co-location facilities each deployed and managed by a single co-location facility provider, wherein at least one of the plurality of edge systems is configured to select a selected edge computing system of the plurality of edge computing systems to process data generated by an Internet of Things (IoT) device, wherein the selected edge computing system is configured to provision an application programming interface (API) endpoint for communication with the IoT device, receive, at the API endpoint, the data associated with the events generated by the IoT device, and process the data associated with the events generated by the IoT device.

In a further example, a computer readable storage medium includes instructions that when executed cause one or more processors of an edge computing system to select the edge computing system, from among a plurality of edge computing systems co-located within respective co-location facilities each deployed and managed by a single co-location facility provider, to process data generated by an Internet of Things (IoT) device, provision an application programming interface (API) endpoint for communication with the IoT device, receive at the API endpoint the data generated by the IoT device, and process the data generated by the IoT device.

The details of one or more examples of the techniques are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the figures and text.

DETAILED DESCRIPTION

Figure 1:
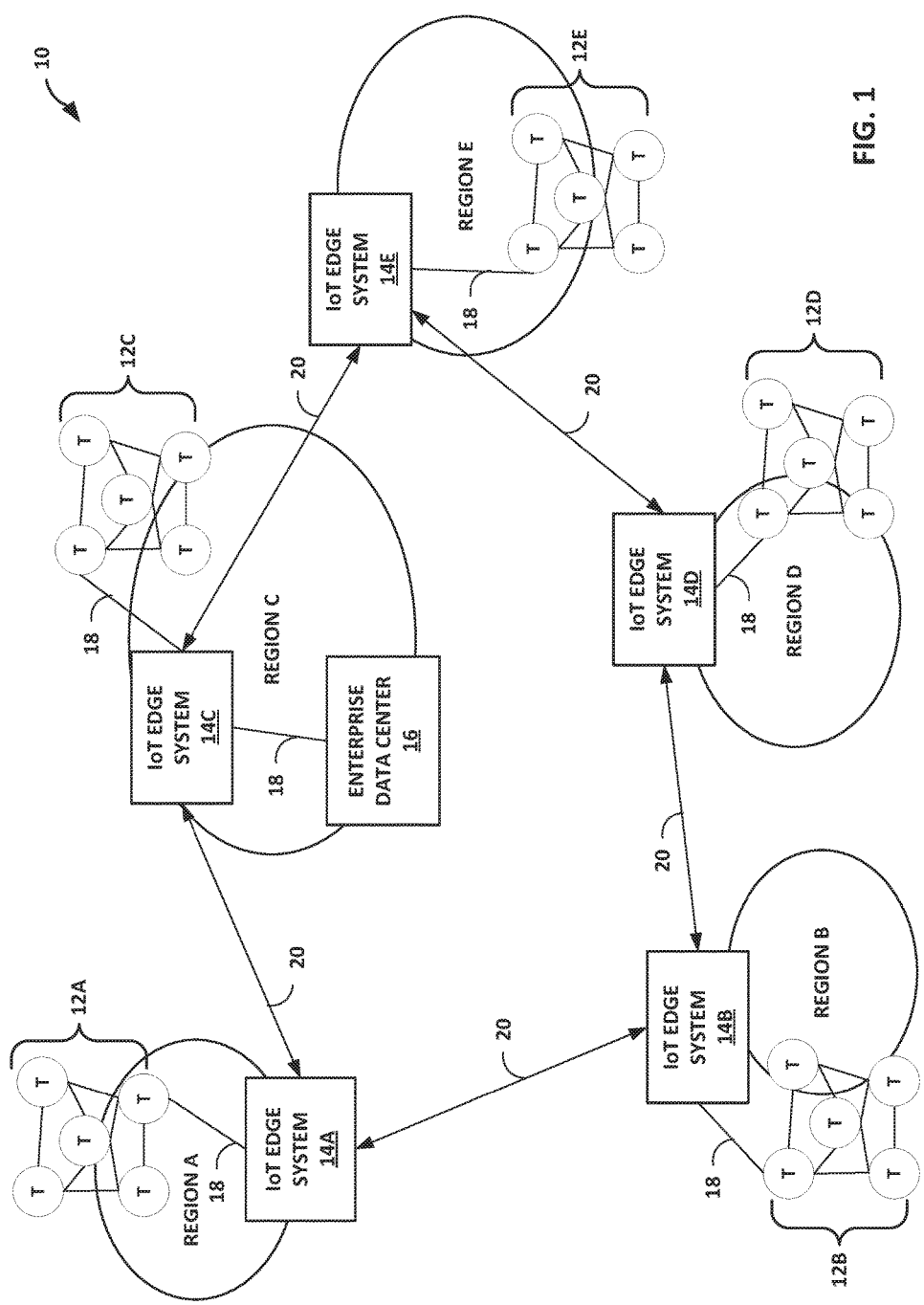
FIG. 1 is a block diagram illustrating an example system of Internet of Things (IoT) edge systems for distributed edge processing of IoT device data and interconnection with a cloud service provider ecosystem, in accordance with techniques described herein.

FIG. 1 is a block diagram illustrating an example system 10 of Internet of Things (IoT) edge systems for distributed edge processing of IoT device data and interconnection with a cloud service provider ecosystem, in accordance with techniques described herein.

In the example of FIG. 1, multiple IoT devices 12A-12E ("IoT devices 12") are located at various geographically distributed regions A-E (e.g., continents or other geographic regions). Each of the multiple IoT devices 12 located at a given region A-E are communicatively coupled to a corresponding IoT edge system of IoT edge systems 14A-14E ("IoT edge systems 14") via a connection 18. For example, each of the sets of IoT devices 12 may communicate with the corresponding IoT edge system 14 via one or more of a metro Ethernet network, the Internet, a mobile backhaul network, or a Multiprotocol Label Switching (MPLS) access network.

IoT devices 12 may be any of a variety of smart devices. In some examples, IoT devices 12 may be personal computing devices, such as smart phones, tablets, smart watches, laptop computers, desktop computers, e-readers, or other computing devices. In some examples, the IoT devices 12 may include devices of the home consumer, such as light bulbs, kitchen utensils, security devices, pet feeding devices, irrigation controllers, smoke alarms, entertainment units, infotainment units, energy monitoring devices, thermostats, and home appliances such as refrigerators, washers, dryers, stoves, for example. As another example, the IoT devices 12 may include devices for transport and mobility, such as devices for traffic routing, telematics, package monitoring, smart parking, insurance adjustments, supply chain, shipping, public transport, airlines, and trains, for example. As another example, the IoT devices 12 may include devices for buildings and infrastructure, such as devices for HVAC, security, lighting, electrical, transit, emergency alerts, structural integrity, occupancy, energy credits, for example. As another example, the IoT devices 12 may include devices for cities and industry, such as devices for electrical distribution, maintenance, surveillance, signage, utilities, smart grid, emergency services, and waste management, for example. In some examples, IoT devices 12 include sensors, such as for sensing conditions of the surrounding environment.

The IoT devices 12 may be associated with one or more enterprises. Enterprises may receive and process data from IoT devices 12 at an enterprise data center 16. Enterprises may use data received from IoT devices 12 for a variety of purposes, such as staying engaged and connected with customers and the marketplace, smarter products and services, business process monitoring, control, and optimization, for example. As other examples, enterprises may use data received from IoT devices 12 for smart, connected workplaces and things, and real-time analytics. However, a large percentage of data received from IoT devices 12 may be "noise," i.e., data that is not specifically needed for any of these purposes. IoT edge systems 14 can provide the ability to filter the data received from IoT devices 12 at the edge of an IT/cloud infrastructure, before sending a subset of the filtered data on to enterprise data center 16 for core enterprise processing on a core processing system computing infrastructure. In some examples, some or all of the core processing system may be cloud service provider network equipment at a co-location facility. This can lower an enterprise's data transfer costs and result in improved scalability for enterprise IoT device data processing, since less data needs to be backhauled and sent across WAN connections 20 to the enterprise data center 16.

As shown in FIG. 1, respective IoT edge systems 14A-14E are located on different geographically distributed regions A-E. IoT edge systems 14 may each be located within geographically distributed co-location facility provider facilities (not shown and hereinafter, "co-location facilities"), e.g., co-location data centers, each associated with (e.g., owned and/or operated by) a single co-location facility provider. The co-location service provider is a single entity, business, operator, service provider, or the like. The distributed co-location facilities in which the IoT edge systems 14 are located are connected by Wide Area Network (WAN) connections 20, e.g., Multi-Protocol Label Switching (MPLS) Gigabit Ethernet connections.

IoT edge systems 14 provide an API-based distributed edge solution that connects IoT devices with IT/Cloud infrastructure in a decoupled, secure, and resilient manner. As described herein, IoT edge systems 14 may each be part of co-location data centers associated with a single co-location facility provider, of which the enterprise may be a customer. By virtue of this arrangement, IoT edge systems can leverage the capabilities of the co-location service provider in the areas of co-location, interconnection, and access to a variety of different cloud service providers (CSPs) and network service providers (NSPs) that are also customers of the co-location facility provider, to enable a distributed datacenter architecture to facilitate edge computing of data from IoT devices 12. In other words, globally-distributed IoT edge system 14 may provide IoT devices and their associated enterprise with a low-latency communication channels via a secure API proxy for IoT event processing and storage. This scalable distributed computing architecture deployed by the co-location facility/IoT edge system 14 provider is in contrast to a centralized computing model, which does not scale well with IoT because all of the IoT traffic is being sent to a centralized processing location.

Distributed processing of IoT device data at the edge of a co-location facility, such as a data center, may improve the way IoT devices interact, integrate, and interconnect with an IT cloud ecosystem, such as enterprise systems, hybrid clouds, applications, and the like. IoT edge systems 14 perform the distributed processing of IoT device data from IoT devices 12. IoT edge systems 14 operate at the Edge Computing layer (data element analysis and transformation) and Connectivity layer (communication and processing units) of the IoT World Forum's IoT Reference Model (layers 3 and 2, respectively). IoT edge systems 14 can help bridge the gap between operational technology (smart sensors, devices, machines, for example) and information technology (including enterprise systems, hybrid clouds, applications, for example).

The arrangement of IoT edge systems 14 in geographically distributed co-location facilities described herein can provide a secure, high speed and low latency connectivity to integrate IoT devices to the enterprise's choice of CSPs/Hybrid Cloud infrastructure for processing IoT workloads in the manner best suited to the needs of the enterprise. This can provide a tailored IoT workload processing solution for the enterprise.

In some examples, IoT edge systems 14 are located in co-location facilities that interconnect multiple different NSPs, giving enterprises using the IoT edge systems 14 to handle their IoT traffic the ability to select an NSP from among the multiple NSPs to backhaul IoT traffic to their preferred locations, such as to enterprise data center 16. This provides the enterprise with the ability to choose an NSP that best meets their needs.

As described in further detail below, the IoT edge systems 14 within system 10 are also configured with various software capabilities, such as software capabilities to enable edge computing of IoT data through dynamic provisioning and device registration. The IoT edge systems 14 may also be configured to provide edge compute capabilities to dynamically route IoT events to CSPs of choice or to a Hybrid Cloud. IoT edge systems 14 can also flexibly shift IoT workload processing end points across clouds and locations, filter IoT events that are noise, convert IoT protocols to cloud-friendly protocol, and perform other edge processing functions. For example, IoT edge systems 14 can provide dynamic edge fabric provisioning capabilities, and dynamic device registration capabilities to deal with device and data burst. IoT edge systems 14 are configured to enable virtualization and cloud access of IoT devices 12 at the edge via Application Programming Interfaces (APIs), such as through the use of edge proxies within IoT edge systems 14. The IoT edge systems 14 can also be configured to provide traffic analytics and data visualization, such as insights on the location, traffic patterns, trigger points, health and state of IoT edge proxies across the globe in real time. In some examples, IoT edge systems 14 may be part of a data center infrastructure monitoring (DCIM) edge system, as in the example of FIG. 13.

Figure 2:
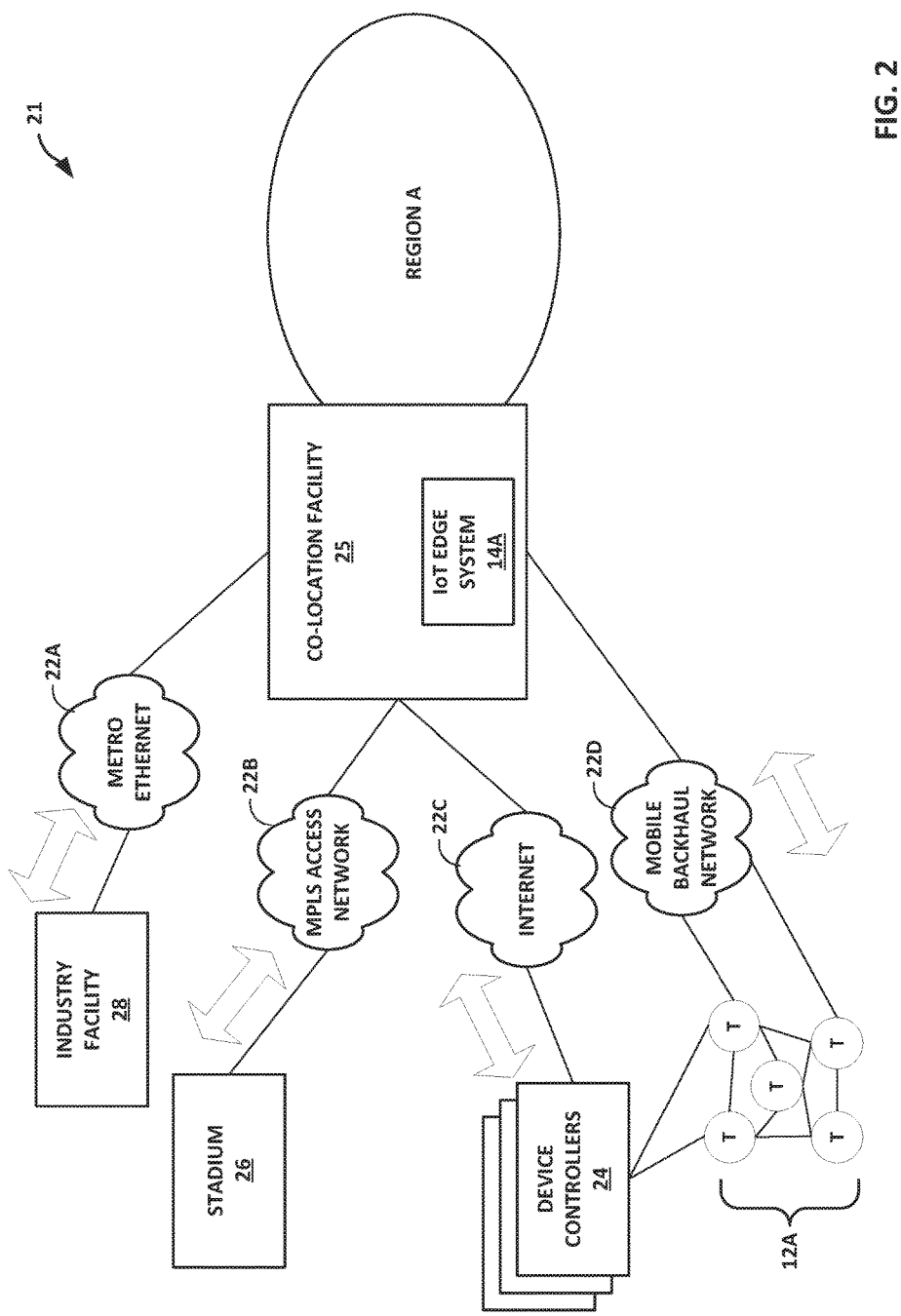
FIG. 2 is a block diagram illustrating an example system that shows an IoT edge system within a co-location facility in further detail, in accordance with techniques described herein.

FIG. 2 is a block diagram illustrating an example system 21 that shows in further detail how IoT edge system 14A and IoT devices 12A may be connected. Each of the sets of IoT devices 12 may be coupled to the respective IoT edge system 14 via a metro Ethernet network 22A, an Multiprotocol Label Switching (MPLS) access network 22B, the Internet 22C, or a mobile backhaul network 22D, for example. As shown in FIG. 2, in addition to communicating with IoT devices 12A, in some examples IoT edge system 14A may communicate with one or more device controllers 24 that control IoT devices 12A. IoT edge system 14A may communicate with one or more other types of facilities, such as stadium 26 and industry facility 28. Stadium 26 and industry facility 28 may each contain large numbers of IoT devices, which are themselves sending data to IoT edge system 14A via MPLS access network 22B or metro Ethernet 22A, for example.

IoT edge system 14A may be part of an interconnection system having a programmable network platform that offers fiber cross-connects between customer cages of interconnection facility. Co-location facility 25 is operated by an co-location facility provider. Co-location facility 25 may have a switch fabric (not shown) configurable for cross-connecting customer networks located within multiple customer cages. In some instances, the customer cages may each be associated with a different customer of the interconnection system provider. As used herein, the term "customer" of the interconnection system provider may refer to a tenant of the co-location facility 25 deployed by the co-location facility provider, whereby the customer leases space within the co-location facility 25 in order to co-locate with other tenants for improved efficiencies over independent facilities as well as to interconnect network equipment with the other tenants' network equipment within the interconnection facility or campus for reduced latency/jitter and improved reliability, performance, and security versus transport networks, among other reasons. The co-location facility provider may in some cases be referred to as an interconnection facility provider, in that these will typically be the same entity. Co-location facility 25 may operate a network services exchange, such as Ethernet Exchange, and Internet Exchange, and/or a Cloud Exchange, for example, to transmit L2/L3 packet data between customer networks. Co-location facility 25 may provide both an Ethernet exchange and a cloud-based services exchange, in some examples.

Further example details of a facility that provides a cloud-based services exchange are found in U.S. Ser. No. 15/099,407, filed Apr. 14, 2016 and entitled "Cloud-Based Services Exchange"; U.S. Ser. No. 14/927,451, filed Oct. 29, 2015 and entitled "INTERCONNECTION PLATFORM FOR REAL-TIME CONFIGURATION AND MANAGEMENT OF A CLOUD-BASED SERVICES EXCHANGE"; and in U.S. Provisional Patent Application 62/160,547, filed May 12, 2015 and entitled "PROGRAMMABLE NETWORK PLATFORM FOR A CLOUD-BASED SERVICES EXCHANGE"; each of which are incorporated herein by reference in their respective entireties.

Although not shown in FIG. 2, IoT edge system 14A may be communicatively coupled to one or more other geographically distributed IoT edge systems 14, as shown in FIG. 1. Using IoT edge system 14A to provide edge processing within co-location facility 25 can reduce the amount of IoT device data being backhauled to by enterprises to data centers, improving scalability. The reduction of data volume facilitated by IoT edge system 14A may also lead to improved performance. Rather than geographically distributed IoT devices connecting to centralized computing architecture, the techniques of this disclosure uses IoT edge systems positioned within globally distributed, interconnected co-location facilities that can allow for more efficient connectivity with IoT devices vastly distributed across the globe. The techniques of this disclosure allow enterprises to dynamically provision the edge processing infrastructure to flexibly handle IoT workloads. IoT edge system 14A filters noise generated by IoT devices 12A, and device controllers 24, at the data center edge. That is, IoT edge system 14A can filter the data received from IoT devices 12A, device controllers 24, stadium 26, and/or industry facility 28 to remove extraneous data not needed by the enterprise. Performing the edge processing within co-location facility 25 (e.g., a co-location data center) can also allow for high speed and low latent connectivity to cloud/IT infrastructure.

IoT edge system 14A may also provide benefits for interoperability. For example, IoT edge system 14A can provide protocol translation at the edge of co-location facility 25 to deal with the varied and multiple protocols used by IoT devices to communicate with cloud/IT infrastructure.

IoT edge system 14A can help manage heterogeneous and non-standardized hardware/software platforms for IoT devices 12A.

IoT edge system 14A may also provide benefits for security and privacy. Security and privacy may be a challenge for IoT devices communicating with cloud/IT infrastructure because there may not be consensus on security standards to be implemented on IoT devices, which could lead to potential for unauthorized use of consumer/enterprise data. IoT edge system 14A provides a uniform mechanism for registration and authentication of IoT devices before the IoT devices can communicate with the cloud/IT infrastructure.

Figure 3:
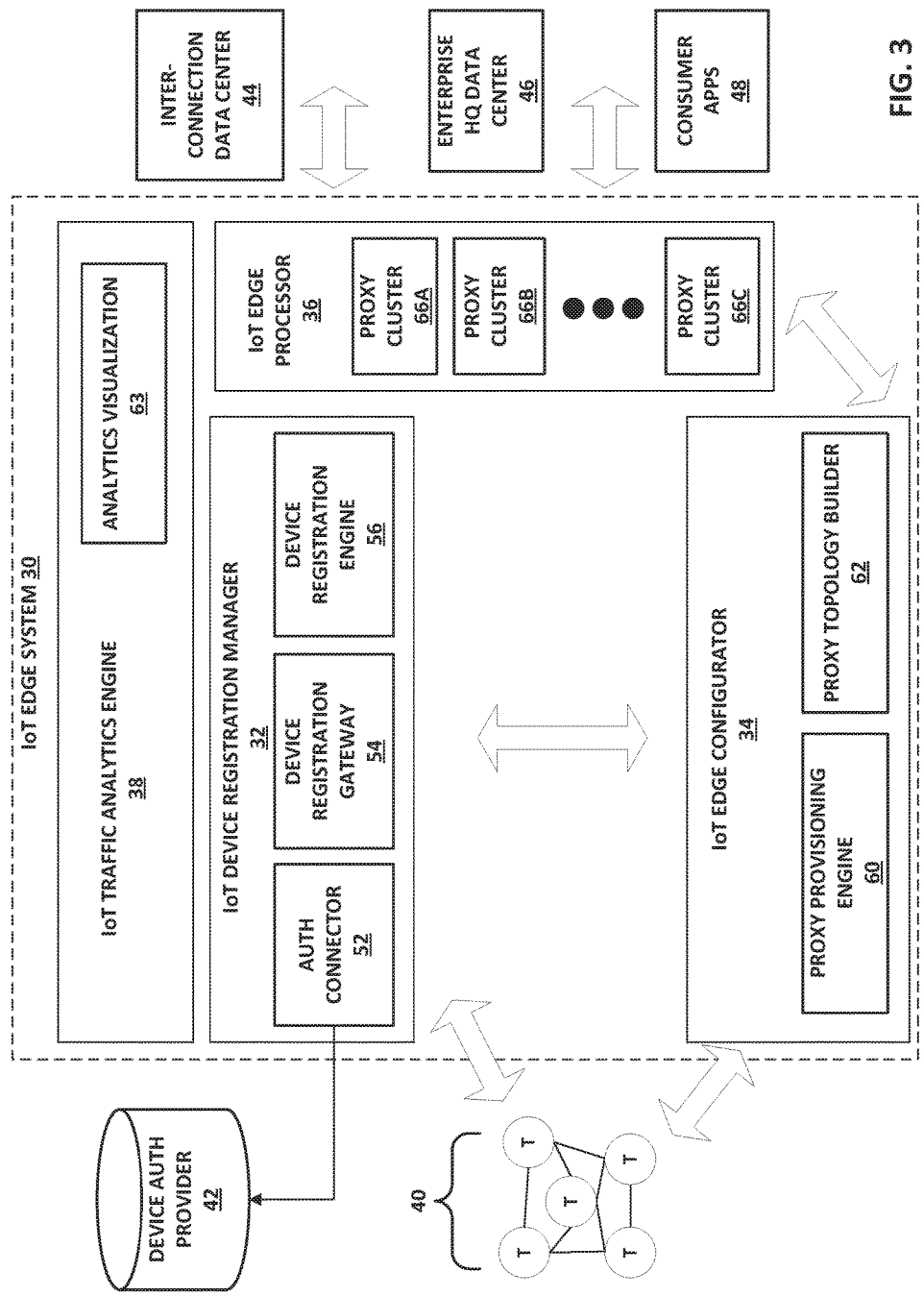
FIG. 3 is a block diagram illustrating an example system that includes an IoT edge system that connects with a network of IoT devices to one or more of an interconnection data center, enterprise headquarters data center, and/or consumer applications.

FIG. 3 is a block diagram illustrating an example system that includes an IoT edge system 30 that connects with a network 40 of IoT devices to one or more of an interconnection data center 44, enterprise headquarters (HQ) data center 46, and/or consumer applications ("apps") 48. Although shown as separate from interconnection data center 44, in some examples IoT edge system 30 may be located within the interconnection data center 44.

In the example of FIG. 3, IoT edge system 30 includes IoT device registration manager 32, IoT edge configurator 34, IoT edge processor 36, and IoT traffic analytics engine 38. In some examples, an IoT edge system may include a subset of these components 32-38.

IoT device registration manager 32 is a distributed component configured to handle device-initiated dynamic registration to securely connect IoT device(s) 40 and/or IoT device controller(s) to the nearest data center edge. IoT edge configurator 34 scales based on its own needs, separate from the IoT edge processor 36. In some examples, the data center may be a co-location facility such as interconnection data center 44, maintained by an interconnection service provider. In some examples, the data center that IoT devices 40 connect to may be an enterprise headquarters data center 46. In some examples, IoT device registration manager 32 may connect IoT devices 40 to one or more consumer applications 48.

IoT device registration manager 32 includes a globally accessible device registration gateway 54 for IoT devices. IoT device registration manager 32 can provide device registration workflow to fulfill device registration requests, which may be managed by device registration engine 56. IoT device registration manager 32 can manage and provide for delegation to third party services for device authentication, such as to device authorization provider 42 ("device auth provider 42"). IoT device registration manager 32 can also provide plug and play support for different authentication connectors 52.

IoT edge configurator 34 is a distributed management component to dynamically provision and manage edge proxy lifecycle across heterogeneous cloud infrastructure. IoT edge configurator 34 includes proxy provisioning engine 60 and proxy topology builder 62, which are described in further detail below. IoT edge configurator 34 interacts with IoT edge processor 36 to provision endpoints and build proxy clusters at IoT edge processor 36 for processing data received from registered IoT devices 40.

IoT edge processor 36 provides policy based IoT event routing, filtering, throttling and converting protocols at the edge of the data center. IoT Edge Processor 36 enables virtualized access to IoT device(s) 40 (and/or access to controller(s) 24 of IoT devices 40, see FIG. 2) via a plurality of edge proxy clusters 66A-66C ("proxy clusters 66"). Proxy clusters 66 are software components provisioned at the edge of the data center to perform edge processing on IoT data traffic. For example, proxy clusters 66 may each be one or more virtual machine instances executing on one or more computing devices. As another example, proxy clusters 66 may be proxy server clusters of server devices. IoT Traffic Analytics Engine 38 analyzes the IoT traffic processed by IoT device registration manager 32, IoT edge processor 36, and/or IoT edge configurator 34. Analytics visualization module 63 of IoT traffic analytics engine 38 can provide data visualization for giving insight on the location, traffic patterns, trigger points, health and state of IoT edge proxies across the globe, in real-time.

Figure 4:
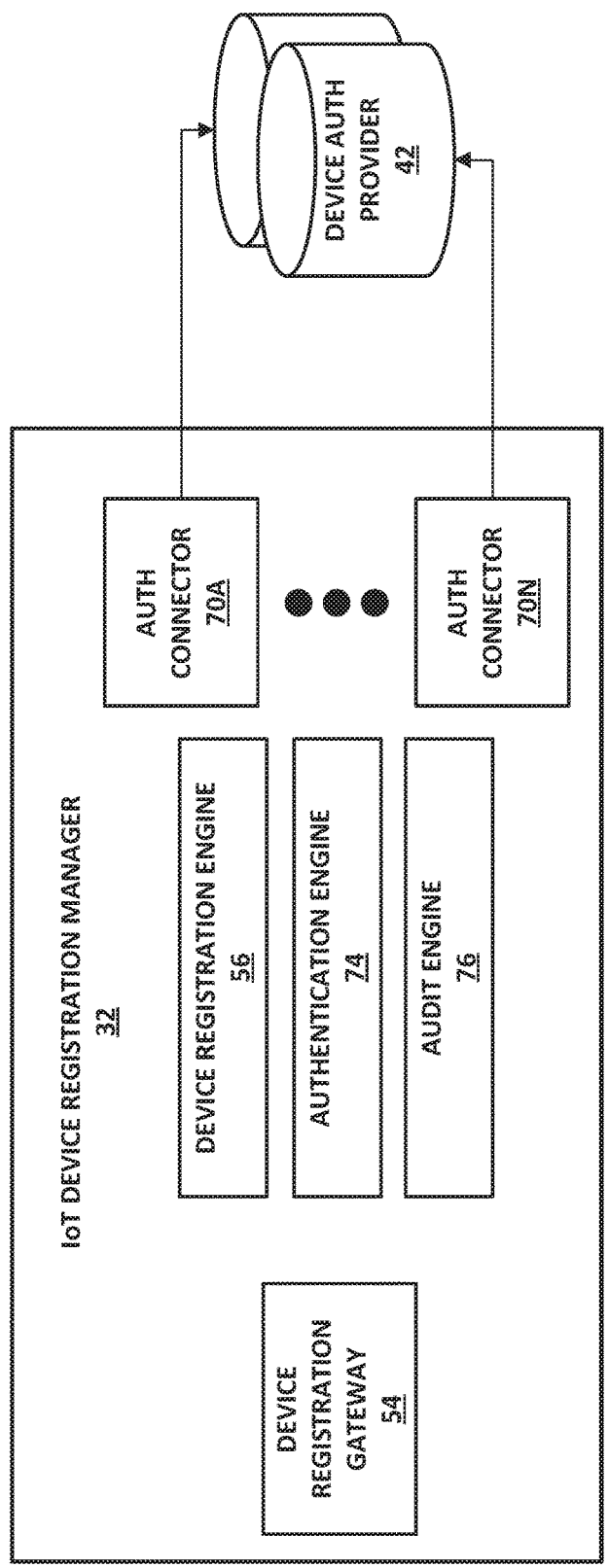
FIG. 4 is a block diagram illustrating an example IoT device registration manager in further detail, in accordance with techniques described herein.

FIG. 4 is a block diagram illustrating an example IoT device registration manager 32 in further detail, in accordance with techniques described herein. Device registration gateway 54 receives requests from IoT devices to register and/or communicate with an enterprise. Device registration gateway 54 passes the request to device registration engine 56, which includes authentication engine 74 and authentication connectors 70A-70N ("authentication connectors 70"). Authentication engine 74 selects an appropriate authentication connector 70 based on the request, and uses authentication connectors 70 to connect with one or more third party device authentication providers 42. Authentication connectors 70 may represent example instances of authentication connector 52 of FIG. 3. Third party device authentication providers 42 may provide device authentication registries, trust credential data stores, and the like. For example, device authentication provider 42 may be a Remote Authentication Dial-In User Service (RADIUS) server.

Device registration engine 56 orchestrates the process described above, as described in further detail below with respect to FIG. 5. Audit engine 76 provides device registration auditing services. Audit engine 76 is used to track and log the states of the edge cluster for operational visibility.

Figure 5:
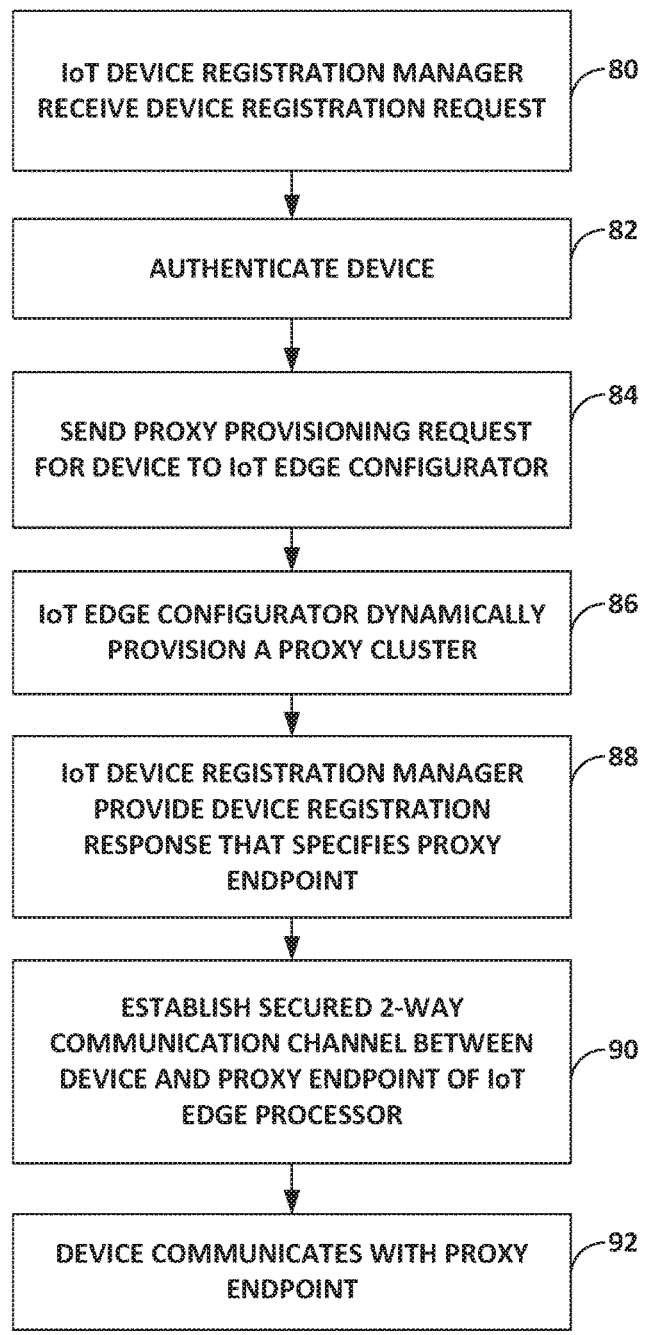
FIG. 5 is a flowchart illustrating example operation of components of an IoT edge system in establishing a connection between an IoT device and a proxy endpoint in accordance with techniques described herein.

FIG. 5 is a flowchart illustrating example operation of components of an IoT edge system in establishing a connection between an IoT device and a proxy endpoint in accordance with techniques described herein. FIG. 5 shows an example flow of an IoT device requesting to register and communicate with the IoT edge system 30. For purposes of example, FIG. 5 is described with respect to the IoT edge system 30 of FIG. 3. FIG. 5 also illustrates interactions between IoT device registration manager 32, IoT edge configurator 34, and IoT edge processor 36 of the IoT edge system 30, as orchestrated by device registration engine 56 of IoT device registration manager 32.

In the example of FIG. 5, device registration gateway 54 of IoT device registration manager 32 receives a device registration request from an IoT device (80). In other examples, device registration gateway 54 may initiate the device registration process to the IoT device(s). After device registration is initiated, device registration gateway 54 and authentication engine 74 authenticate the IoT device (82), such as by one of authentication connectors 70 communicating with a third-party device authentication provider 42.

Upon receiving notification from authentication engine 74 that the IoT device has successfully been authenticated, device registration gateway 54 declares the IoT device "registered," and notifies device registration engine 56. Device registration engine 56 in turn sends a proxy provisioning request for the IoT device to IoT edge configurator 34, requesting that a proxy cluster be provisioned for the IoT device to communicate with (84).

Proxy provisioning engine 60 of IoT edge configurator 34 receives the proxy provisioning request from IoT device registration manager 32, and proxy provisioning engine 60 dynamically provisions a proxy cluster 66 within IoT edge processor (86) for the IoT device. For example, proxy provisioning engine 60 determines which interconnection facility data center should handle the edge processing based on configured rules, device type, and/or location store information, and provides the selected data center information to proxy topology builder 62. In turn, proxy topology builder 62 builds a dynamic proxy cluster for handling the edge processing and deploys the proxy cluster in the selected data center. The proxy cluster is an interconnected graph of compute nodes located in a data center, which provide functions such as event routing, throttling, security, filtering, protocol conversion, etc. A cluster of compute nodes is provided for load balancing purposes for processing the IoT event data, and for service chaining purposes. The proxy cluster provisioned by proxy provisioning engine 60 may be dedicated to processing IoT data traffic for a given enterprise.

For example, proxy provisioning engine 60 may select an IoT edge system located in a data center facility physically (geographically) closest to the IoT device, based on location information specifying the IoT device location that is included in the device registration request and the known location of the data center facility. In this manner, an IoT device registration manager 32 of a first IoT edge system (e.g., IoT edge system 14A of FIG. 1) located in a first co-location facility may handle the device registration and proxy provisioning, while the actual proxy cluster provisioned to perform the edge processing is located in an IoT edge processor 36 of a second, geographically separate IoT edge system, such as IoT edge system 14B located in a second co-location facility. In this way, IoT device registration manager 32, IoT edge configurator 36, and IoT edge processor 36 each serve as independent, distributed control planes providing different control functions across the distributed IoT edge systems 14.

Once that is done, proxy provisioning engine 60 creates an endpoint for the IoT device and connects the endpoint to the proxy cluster. To connect the endpoint for the IoT device to the proxy cluster, proxy provisioning engine 60 may register or otherwise configure the endpoint for the device within a proxy gateway (e.g., an API gateway) for the proxy cluster that receives IoT events and distributes the IoT events to compute nodes within the proxy cluster. Proxy provisioning engine 60 provides the endpoint information (e.g., a URL or URI) to device registration gateway 54 of IoT device registration manager 32, which in turn sends a device registration response to the IoT device/app or device controller indicating the assigned proxy endpoint (88).

The IoT device or device controller and the IoT edge processor proxy endpoint communicate to establish a secured two-way communication channel between the IoT device or device controller and IoT edge processor proxy endpoint (90) (e.g., Web sockets, Hyper-Text Transfer Protocol 2 (HTTP2), Secure Sockets Layer (SSL), Transmission Control Protocol (TCP)). Although described for purposes of example as using Device-Proxy communication using SSL-based Web sockets over TCP, one or more other protocols may be used, such as Message Queuing Telemetry Transport (MQTT), MQTT for Sensor Networks (MQTT-SN), Transport Layer Security (TLS), Datagram Transport Layer Security (DTLS), Advanced Message Queuing Protocol, Constrained Application Protocol (CoAP), Extensible Messaging and Presence Protocol (XMPP), for example. The IoT device communicates with the proxy endpoint over the two-way communication channel (92).

Figure 6:
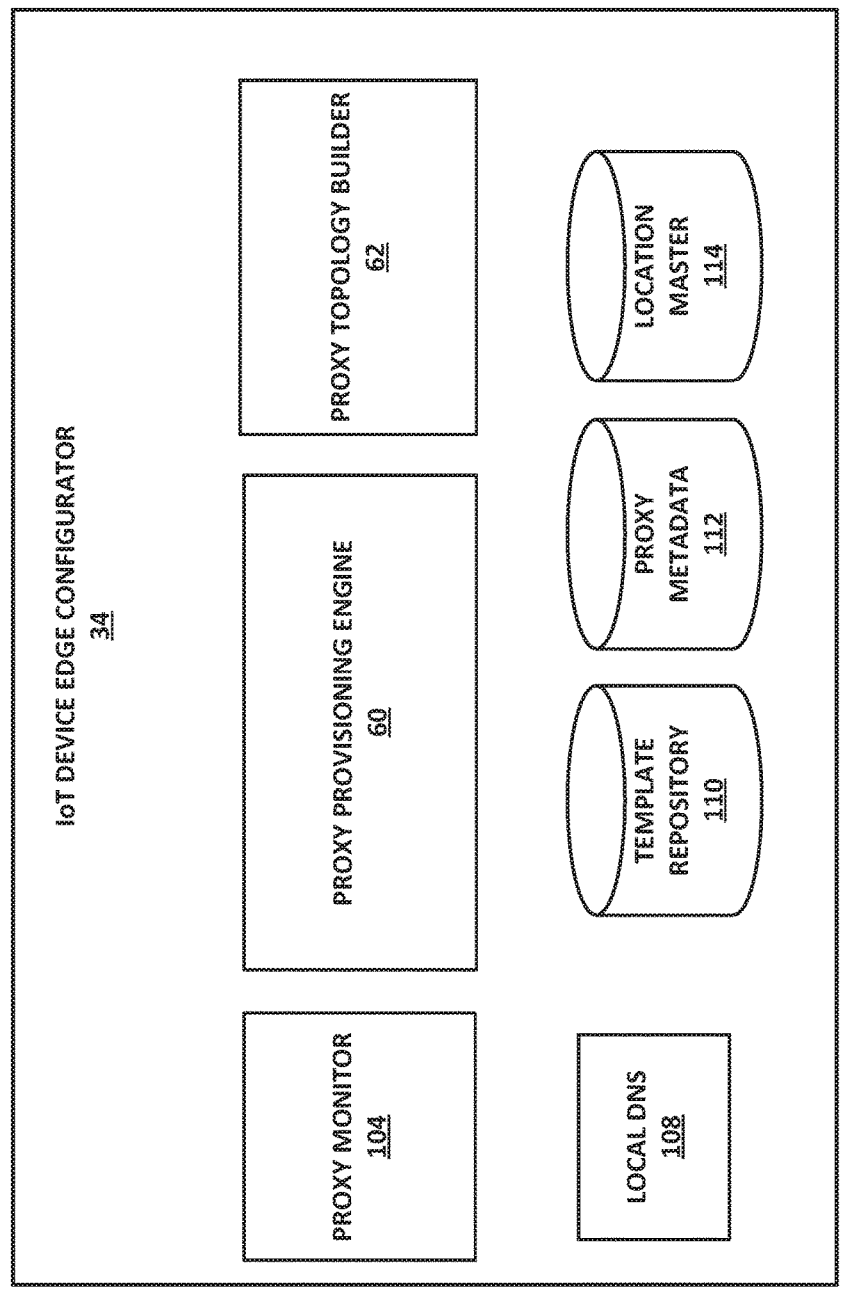
FIG. 6 is a block diagram illustrating IoT device edge configurator in accordance with techniques described herein.

FIG. 6 is a block diagram illustrating IoT device edge configurator 34 in accordance with techniques described herein. IoT device edge configurator 34 is a distributed management component to dynamically provision and manage edge proxy lifecycle across heterogeneous cloud infrastructure.

After an IoT device is registered and authenticated, proxy provisioning engine 60 determines where to instruct proxy topology builder 62 to build a dynamic proxy cluster, and also determines what software components/functionality should be included in the proxy cluster, where the proxy cluster is for performing edge processing of IoT device data. In some examples, proxy provisioning engine 60 determines these things based on one or more of IoT device location and IoT device type. Proxy topology builder 62 dynamically builds a proxy topology to provide multiple edge functions. This may include designing service chains to send IoT device data through multiple compute nodes that each provide respective edge services. In some examples, proxy provisioning engine 60 applies a predictive model to optimize the provisioning of edge proxies.

Proxy provisioning engine 60 can provide provisioning to a device controller to enable routing at the proxy device. Proxy provisioning engine 60 can provide provisioning of data processing proxy clusters to heterogeneous clouds. Proxy provisioning engine 102 provides template-based proxy provisioning to multiple heterogeneous platforms. For example, proxy provisioning engine 60 may provide dynamic proxy provisioning based on device type using template repository 110, which maintains templates for device types. The device type may be included in the device registration request. The templates stored at template repository 110 specify what kind of software needs to be created for the proxy clusters based on the device type. For example, a first type of device may need a proxy cluster configured to perform a first set of data processing (e.g., filtering and network protocol translation), and a second type of device may need a proxy cluster configured to perform a second set of data processing (e.g., throttling and network protocol translation).

In some examples, proxy provisioning engine 60 uses location information stored in location master 114 to provide dynamic proxy provisioning based on device geographic location. For example, location master 114 may include information specifying a geographic location of all data centers accessible to the interconnection facility in which the IoT edge computing system is located. Proxy provisioning engine 60 can use information specifying the location of an IoT device (received in the device registration request) relative to the locations of the data centers, to select a data center that is closest to the IoT device and at which to build a proxy cluster for processing data received from that IoT device. After proxy topology builder 62 builds the proxy cluster, proxy provisioning engine 60 stores information about the proxy cluster to proxy metadata 112. Proxy metadata 112 can be used by IoT traffic analytics engine 38 for visualization of proxy cluster information.

In some examples, proxy metadata 112 may include data specifying what proxy device is assigned to a registered IoT device. Proxy metadata 112 may also include data specifying the edge functions provided by different proxy devices, which proxy provisioning engine uses to provision proxy devices according to the needs of the registering device.

Proxy monitor 104 monitors proxy cluster failures, and provides automatic recovery from proxy cluster failures. For example, proxy monitor 104 may be alerted to a proxy cluster failure or degradation based on detecting one or more of a compute node not responding, traffic congestion, high resource utilization, or other conditions. When proxy monitor 104 detects that a proxy cluster has failed (or degraded below a threshold level of operation), proxy monitor 104 informs proxy provisioning engine 60, which provisions a new proxy cluster to be built by proxy topology builder 62. In some examples, proxy monitor 104 can delete/deprovision proxy clusters that proxy monitor 104 determines are no longer needed. For example, proxy monitor 104 may determine that a proxy cluster is no longer needed in response to determining (e.g., via proxy gateway manager 106) that an IoT device has disconnected from the endpoint. As another example, proxy monitor 104 may determine that a proxy monitor 104 is no longer needed based on usage statistics. Local Domain Name System (DNS) 108 provides a unique namespace to the nodes in a proxy cluster.

Figure 7:
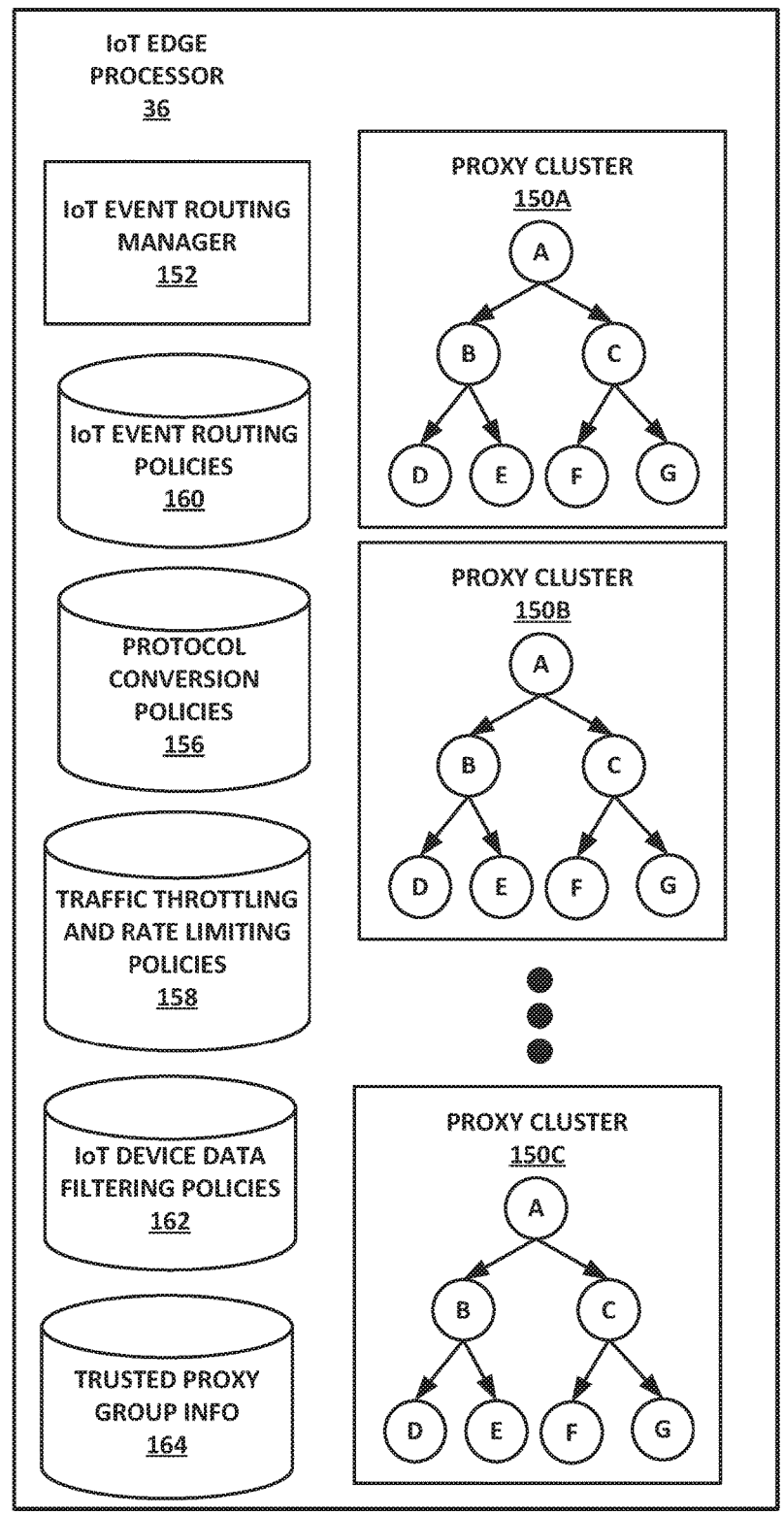
FIG. 7 is a block diagram illustrating further details of one example of a computing device that operates in accordance with one or more techniques of the present disclosure.

FIG. 7 is a block diagram illustrating an example IoT edge processor 36 in further detail, in accordance with one or more aspects of the present disclosure.

IoT edge processor 36 includes a plurality of proxy clusters 150A-150C ("proxy clusters 150") that are dynamically built by proxy topology builder 62 of IoT device edge configurator 34. Each of proxy clusters 150 represents an interconnected graph of compute nodes, such as virtual machines or real servers, having software components dynamically provisioned and built at the edge of the data center to process IoT events by, e.g., event routing, throttling, applying security, filtering, and converting IoT protocols. Each of the compute nodes may be configured with software components and forwarding information to direct a processed IoT event along the graph provisioned for the corresponding endpoint at which the IoT event is received. In this way, proxy clusters 150 execute to process IoT events received by a proxy gateway at proxy endpoints and distributed, by the proxy gateway, to the proxy clusters according to the proxy endpoints.

Proxy endpoints of proxy clusters 150 provide policy-based IoT event routing based on IoT event routing policies 152. IoT event routing policies 160 specify events or other criteria, and destinations to which to route data from IoT devices based on the particular events or criteria. IoT event routing policies 160 provide proxy clusters 150 with the capability to route IoT events to different destinations based on IoT event types. Some examples of IoT event types may include status of devices, temperature of machines, location of devices, for example. IoT event routing policies 160 may be configured by customers of the co-location facility (e.g., enterprises). This provides enterprises with the ability to change route destinations and control aspects of the route taken to reach the destinations. Example route destinations may include, for example, any of a plurality of interconnection data centers at different locations (e.g., interconnection data center 44 of FIG. 3), an enterprise HQ data center 46 (e.g., via any of a plurality of NSPs), one or more consumer applications 48, or other destinations.

For example, an enterprise can configure IoT event routing policies 160 to route to a data center of the enterprise via a choice of NSPs, such as via a cross connect. As another example, an enterprise can configure IoT event routing policies 160 to select a particular interconnection facility/data center to which to route IoT device data for processing. In some examples, IoT event routing policies 160 may be configured to route IoT data associated with particular IoT events to a CSP in the nearest region, sending the IoT data traffic to the CSP via a direct connection or cloud exchange connection in the interconnection facility. In some examples, IoT event routing policies 160 may be configured to route IoT data associated with particular IoT events to a data hub for private, secure storage, such as via a cross connect. In some examples, IoT event routing policies 160 may be configured to route IoT data associated with particular IoT events to a cage/data hub in a different data center facility of the co-location facility provider, such as via a metro connect that interconnects multiple facilities of the co-location service provider that are located within a single metropolitan area.

In some examples, IoT event routing manager 152 may be configured to dynamically modify entries in IoT event routing policies 160 change route destinations specified by IoT event routing policies 160 based on detecting network conditions, such as for load balancing or in the event of network failures or degradation of service on a particular default router or at a particular destination. For example, IoT event routing manager 152 may cause proxy clusters 150 to switch from routing IoT device data via a first NSP to routing IoT device data via a second NSP, such as if the first NSP experiences performance issues.

In addition to IoT event routing, the IoT Edge Processor 36 is also responsible for functions like IoT data traffic throttling, IoT data traffic protocol conversion, and IoT data noise filtering. Proxy endpoints of proxy clusters 150 perform IoT event filtering and discarding of traffic that is filtered out according to IoT device data filtering policies 162. Customers (e.g., enterprises) can configure IoT device data filtering policies 162 to specify what IoT device data will be filtered out at the data center edge by proxy endpoints of proxy clusters 150. In this way, enterprises can decrease the amount of IoT device data that is sent to their data center or other destination for processing to avoid sending data that does not need to be stored or analyzed.

IoT edge processor 36 provides support for IoT data traffic received via multiple different protocols, and proxy endpoints of proxy clusters 150 can provide conversion between IoT data message formats associated with different protocols (e.g., MQTT to Hyper-Text Transfer Protocol (HTTP)), such as based on protocol conversion policies 156. Proxy endpoints of Proxy clusters 150 can apply traffic throttling and rate limiting policies 160 to perform traffic throttling and rate limiting to IoT device data received by IoT edge system 30, such as based on traffic throttling and rate limiting policies 158, which may also be configured by the enterprises. IoT edge processor 36 may also store trusted proxy group information 164, which is used to provide a decoupled security architecture as described in further detail below with regard to FIG. 9.

Figure 8:
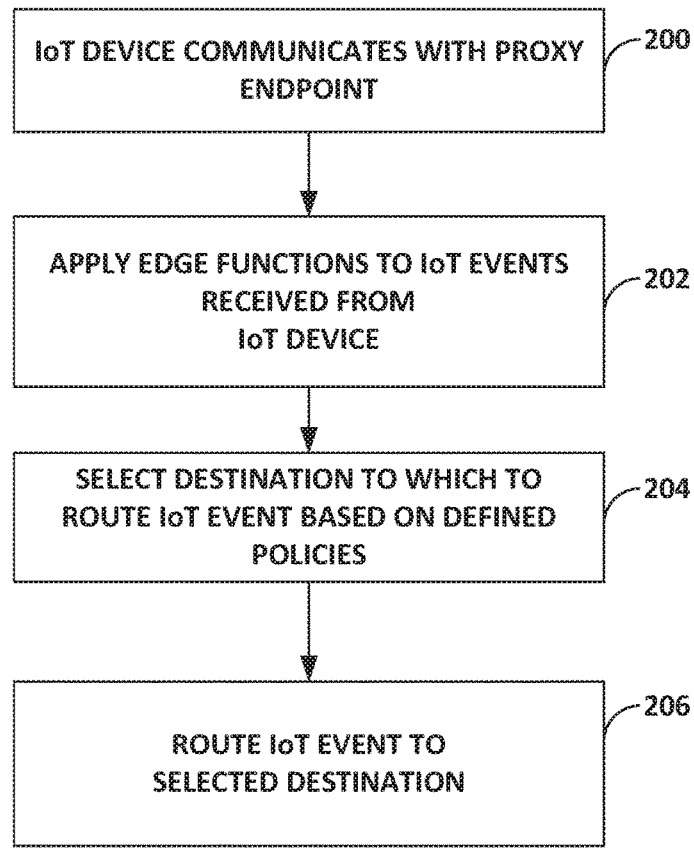
FIG. 8 is a flowchart illustrating example mode of operation of an IoT edge processor of an IoT edge system in accordance with one or more aspects of the present disclosure.

FIG. 8 is a flowchart illustrating example mode of operation of an IoT edge processor 36 of an IoT edge system in accordance with one or more aspects of the present disclosure. FIG. 8 is described with reference to FIG. 7 but is applicable to other examples of IoT edge processors described in this disclosure.

After an IoT device has been authenticated and registered by IoT device registration manager 32 as described above, and IoT edge configurator 34 has provisioned a proxy endpoint of one of proxy clusters 150, the IoT device communicates with the proxy endpoint (200). The proxy endpoint applies edge functions to IoT event data received from the IoT device, such as device data filtering in accordance with IoT device data filtering policies 162, protocol conversion in accordance with protocol conversion policies 156, and traffic throttling and/or rate limiting in accordance with traffic throttling and rate limiting polices 158 (202). The proxy endpoint selects a destination to which to route the IoT event data based on defined IoT event routing policies 160 (204), and routes the IoT event data to the selected destination (e.g., an enterprise or CSP core processing system) for storage and/or additional processing (206). In some examples, the IoT event data routed to the selected destination may be a subset of the IoT event data originally received, i.e., that data remaining after some IoT event data has been filtered out and discarded based on the IoT device data filtering policies 162, and/or traffic throttling and rate limiting polices 158.

Figure 9:
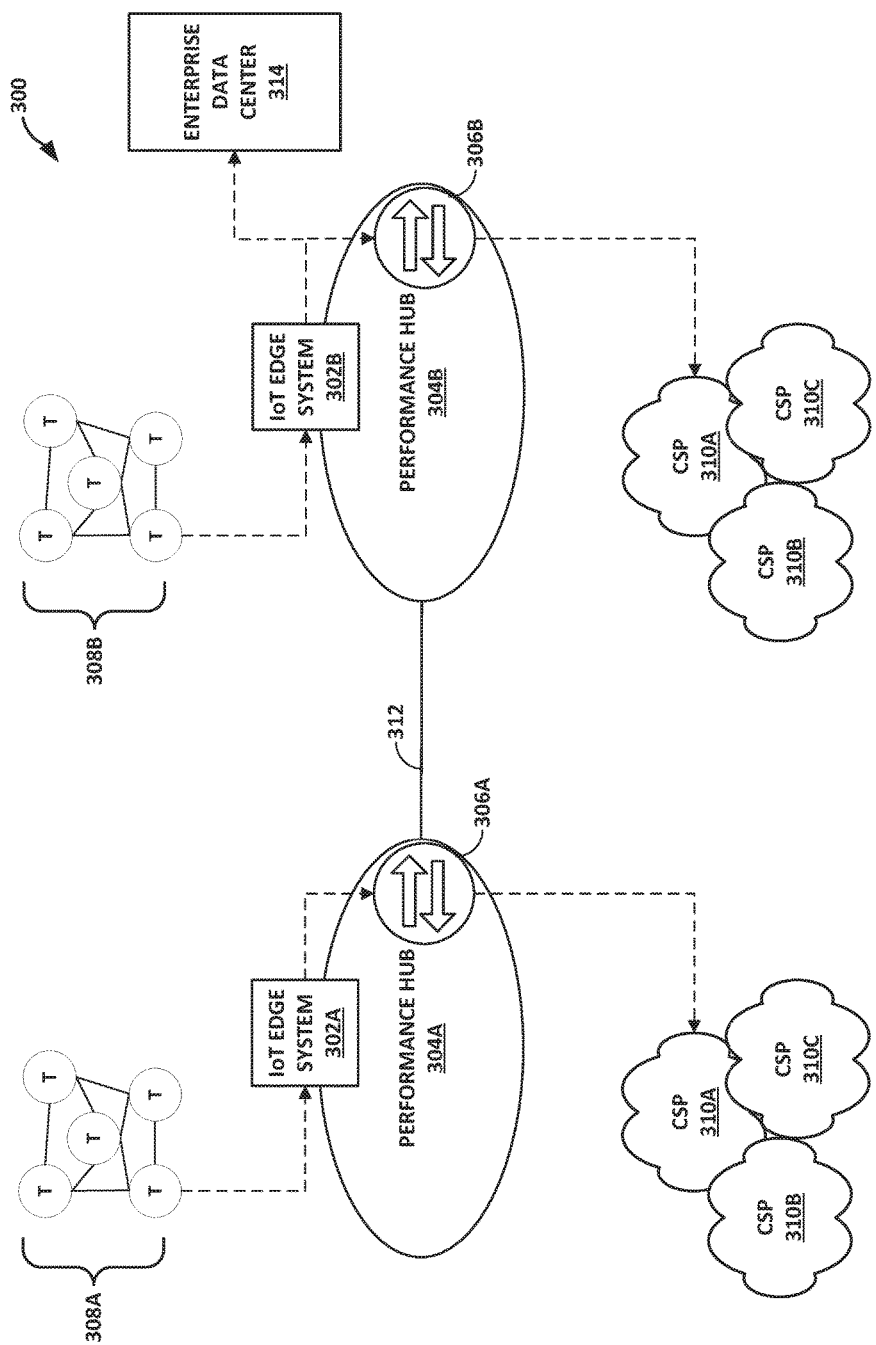
FIG. 9 is a block diagram illustrating an example distributed architecture that provides multi-cloud access via an interconnection platform for flexibly processing IoT workloads.

FIG. 9 is a block diagram illustrating an example system 300 having a distributed architecture that provides multi-cloud access via an interconnection platform for flexibly processing IoT workloads.

System 300 leverages a distributed interconnection facility service provider facilities including performance hubs 304A-304B to enable Hybrid Cloud for IoT workload processing. Performance hubs 304A-304B may be operated by a single co-location facility provider.

IoT edge systems 302A-302B ("IoT edge systems 302") may be similar to the IoT edge systems described with FIGS. 1-8. The event routing capabilities of IoT edge systems 302 enable Multi-Cloud Access via an Interconnection Platform (Cloud Exchange or Direct Connect) for elastic workload processing. Interconnection platform elements 306A-306B represent a cloud exchange or direct connect connectivity to any of a plurality of cloud service providers 310A-310C.

IoT edge systems 302 may enable enterprises to improve network, compute and storage costs by providing the flexibility to shift IoT workload processing from the network edge to the core, and vice-versa.

IoT edge systems 302 can be used within the interconnection-oriented architecture of system 300 to accomplish a variety of goals. For example, system 300 can be used to push applications and services to the network edge using IoT edge systems 302 and performance hubs 304. As another example, system 300 can be used to interconnect people (e.g., employees and customers), locations (e.g., offices and data centers), data (e.g., in-flight and at-rest), and cloud (e.g., private—on-premises, private—off-premises, and public/hybrid) and deliver via cloud and ecosystem offerings. As another example, system 300 can push IoT data and analytics to a data hub based on data center proximity.

The interconnection-oriented architecture for IoT workload processing illustrated in FIG. 9 may have advantages to a co-location facility provider. As one example, the interconnection-oriented architecture for IoT workload processing may attract more enterprises to the co-location facility provider's facilities and potentially increase the efficiency of such facilities through returns to scale of power, cooling, and other provisions of the facilities. The IoT deployments may also generate performance hub and co-location revenue.

As another example, cloud is an important component to successfully enable IoT solutions where large amounts of data processing and storage are required. IoT edge systems 302 can enable IoT data to flow into CSPs/NSPs co-location service provider's data centers via interconnect products such as cloud exchanges, thereby increasing a number of interconnections within facilities and potentially improving the efficiency of such facilities.

As a further example, IoT solutions typically require deployments in multiple markets that are geographically wide spread. The interconnection-oriented architecture for IoT workload processing may seamlessly enable globally distributed data center architectures.

Figure 10:
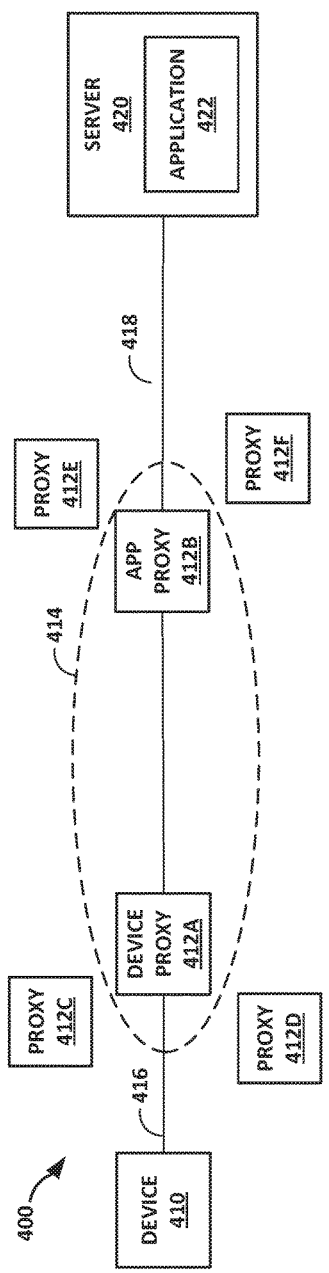
FIG. 10 is a block diagram illustrating an example pattern in which an IoT device communicates with an application via a decoupled security architecture facilitated by the IoT edge systems described herein.

FIG. 10 is a block diagram illustrating an example system 400 in which an IoT device 410 communicates with an application 422 via a decoupled security architecture facilitated by the IoT edge systems described herein. The application 422 is executing at a server 420. The example of FIG. 10 will be described with reference to the examples of FIGS. 1 and 3. IoT device 452 may be one of IoT devices 12 of FIG. 1. In some examples, proxies (e.g., proxy clusters 66) provisioned by IoT edge configurator 34 of the IoT edge system 30 may be organized into logical groups referred to as trusted proxy groups (TPGs), which are groups of proxies that can exchange data and commands. In the example of FIG. 10, an IoT device 410 connects to device proxy 412A as described in one or more examples above, and authenticates with device proxy 412A using device credentials such as digital fingerprint, certificates, cipher, etc. The IoT device 410 connects using HTTP(S), web sockets, a publish/subscribe messaging protocol for wireless sensor networks such as MQTT(-SN), or Constrained Application Protocol (CoaP), for example, and may connect via the Internet, a metro Ethernet network, a mobile backhaul network, or an MPLS network, for example. On the application side, application 422 connects with application 412B proxy using application credentials such as tokens, keys, etc. Because device proxy 412A is in the same trusted proxy group 414 as application proxy 412B, device proxy 412A and application proxy 412B can exchange data and commands. Using trusted proxy groups provides a decoupled security architecture that allows IoT devices to communicate with applications in a secure way, without necessarily requiring security interoperability between the applications and the IoT devices themselves.

Figure 11:
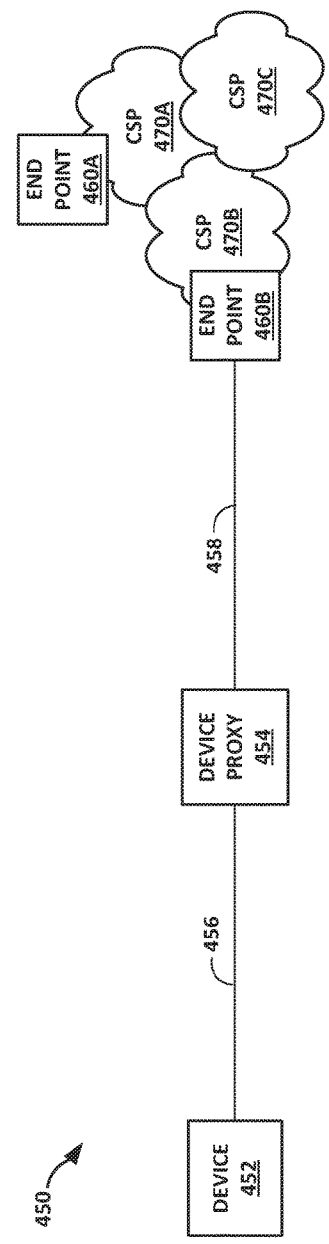
FIG. 11 is a block diagram illustrating an example pattern in which an IoT device communicates with data collection endpoints in the cloud, as facilitated by the IoT edge systems described herein.

FIG. 11 is a block diagram illustrating an example system 450 in which an IoT device 452 communicates with data collection endpoints 460A-460B in the cloud, as facilitated by the IoT edge systems described herein. CSP networks 470A-470C may be cloud service provider networks, such as CSPs 310 of FIG. 9. IoT device 452 may be one of IoT devices 12 of FIG. 1. In the example of FIG. 11, an IoT device 452 authenticates with a device proxy 454 over communication channel 456 using device credentials such as digital fingerprint, certificates, cipher, etc. Device proxy 454 may be one of proxy clusters 66 provisioned by IoT edge configurator 34 (FIG. 3). The device proxy 454 authenticates with a cloud service provider endpoint 460B in the cloud service provider network 470B over communication channel 458, via endpoint-enforced standards.

Figure 12:
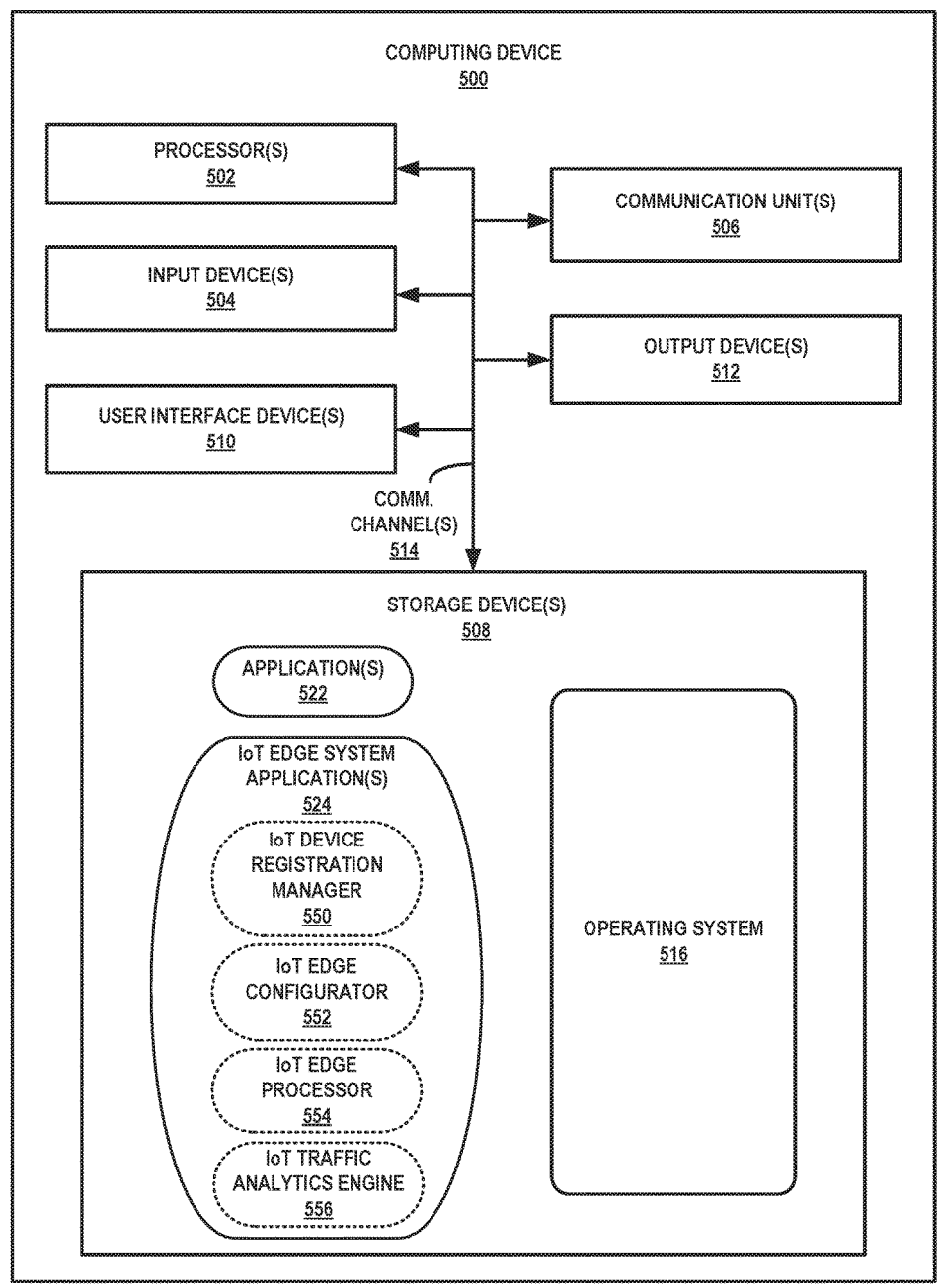
FIG. 12 is a block diagram illustrating further details of one example of a computing device that operates in accordance with one or more techniques of the present disclosure.

FIG. 12 is a block diagram illustrating further details of one example of a computing device that operates in accordance with one or more techniques of the present disclosure. FIG. 12 may illustrate a particular example of a server or other computing device 500 that includes one or more processor(s) 502 for executing any one or more of IoT device registration manager 32, IoT edge configurator 34, IoT edge processor 36, IoT traffic analytics engine 38, or any other computing device described herein. Other examples of computing device 500 may be used in other instances. Computing device 500 may be, for example, any of IoT edge systems 14A-14D (FIGS. 1-2) or IoT edge system 30 (FIG. 3). Although shown in FIG. 12 as a stand-alone computing device 500 for purposes of example, a computing device may be any component or system that includes one or more processors or other suitable computing environment for executing software instructions and, for example, need not necessarily include one or more elements shown in FIG. 12 (e.g., communication units 506; and in some examples components such as storage device(s) 508 may not be co-located or in the same chassis as other components).

As shown in the example of FIG. 12, computing device 500 includes one or more processors 502, one or more input devices 504, one or more communication units 506, one or more output devices 512, one or more storage devices 508, and user interface (UI) device(s) 510. Computing device 500, in one example, further includes one or more application(s) 522, IoT edge system application(s) 524, and operating system 516 that are executable by computing device 500. Each of components 502, 504, 506, 508, 510, and 512 are coupled (physically, communicatively, and/or operatively) for inter-component communications. In some examples, communication channels 514 may include a system bus, a network connection, an inter-process communication data structure, or any other method for communicating data. As one example, components 502, 504, 506, 508, 510, and 512 may be coupled by one or more communication channels 514.

Processors 502, in one example, are configured to implement functionality and/or process instructions for execution within computing device 500. For example, processors 502 may be capable of processing instructions stored in storage device 508. Examples of processors 502 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 508 may be configured to store information within computing device 500 during operation. Storage device 508, in some examples, is described as a computer-readable storage medium. In some examples, storage device 508 is a temporary memory, meaning that a primary purpose of storage device 508 is not long-term storage. Storage device 508, in some examples, is described as a volatile memory, meaning that storage device 508 does not maintain stored contents when the computer is turned off. Examples of volatile memories include random access memories (RAM), dynamic random access memories (DRAM), static random access memories (SRAM), and other forms of volatile memories known in the art. In some examples, storage device 508 is used to store program instructions for execution by processors 502. Storage device 508, in one example, is used by software or applications running on computing device 500 to temporarily store information during program execution.

Storage devices 508, in some examples, also include one or more computer-readable storage media. Storage devices 508 may be configured to store larger amounts of information than volatile memory. Storage devices 508 may further be configured for long-term storage of information. In some examples, storage devices 508 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 500, in some examples, also includes one or more communication units 506. Computing device 500, in one example, utilizes communication units 506 to communicate with external devices via one or more networks, such as one or more wired/wireless/mobile networks. Communication units 506 may include a network interface card, such as an Ethernet card, an optical transceiver, a radio frequency transceiver, or any other type of device that can send and receive information. Other examples of such network interfaces may include 3G and WiFi radios. In some examples, computing device 500 uses communication unit 506 to communicate with an external device.

Computing device 500, in one example, also includes one or more user interface devices 510. User interface devices 510, in some examples, are configured to receive input from a user through tactile, audio, or video feedback. Examples of user interface devices(s) 510 include a presence-sensitive display, a mouse, a keyboard, a voice responsive system, video camera, microphone or any other type of device for detecting a command from a user. In some examples, a presence-sensitive display includes a touch-sensitive screen.

One or more output devices 512 may also be included in computing device 500. Output device 512, in some examples, is configured to provide output to a user using tactile, audio, or video stimuli. Output device 512, in one example, includes a presence-sensitive display, a sound card, a video graphics adapter card, or any other type of device for converting a signal into an appropriate form understandable to humans or machines. Additional examples of output device 512 include a speaker, a cathode ray tube (CRT) monitor, a liquid crystal display (LCD), or any other type of device that can generate intelligible output to a user.

Computing device 500 may include operating system 516. Operating system 516, in some examples, controls the operation of components of computing device 500. For example, operating system 516, in one example, facilitates the communication of one or more applications 522 and IoT edge system application(s) 524 with processors 502, communication unit 506, storage device 508, input device 504, user interface devices 510, and output device 512.

Application 522 and IoT edge system application(s) 524 may also include program instructions and/or data that are executable by computing device 500. Example IoT edge system application(s) 524 executable by computing device 500 may include any one or more of IoT device registration manager 550, IoT edge configurator 552, IoT edge processor 554, and IoT traffic analytics engine 556, each illustrated with dashed lines to indicate that these may or may not be executable by any given example of computing device 500.

In this example, IoT edge system applications 524 include IoT device registration manager 550, IoT edge configurator 552, IoT edge processor 554, and IoT traffic analytics engine 556. IoT device registration manager 550 may include instructions for causing computing device 500 to perform one or more of the operations and actions described in the present disclosure with respect to IoT device registration manager 32. IoT edge configurator 552 may include instructions for causing computing device 500 to perform one or more of the operations and actions described in the present disclosure with respect to IoT edge configurator 34. IoT edge processor 554 may include instructions for causing computing device 500 to perform one or more of the operations and actions described in the present disclosure with respect to IoT edge processor 36. IoT traffics analytics engine 556 may include instructions for causing computing device 500 to perform one or more of the operations and actions described in the present disclosure with respect to IoT traffic analytics engine 38.

Figure 13:
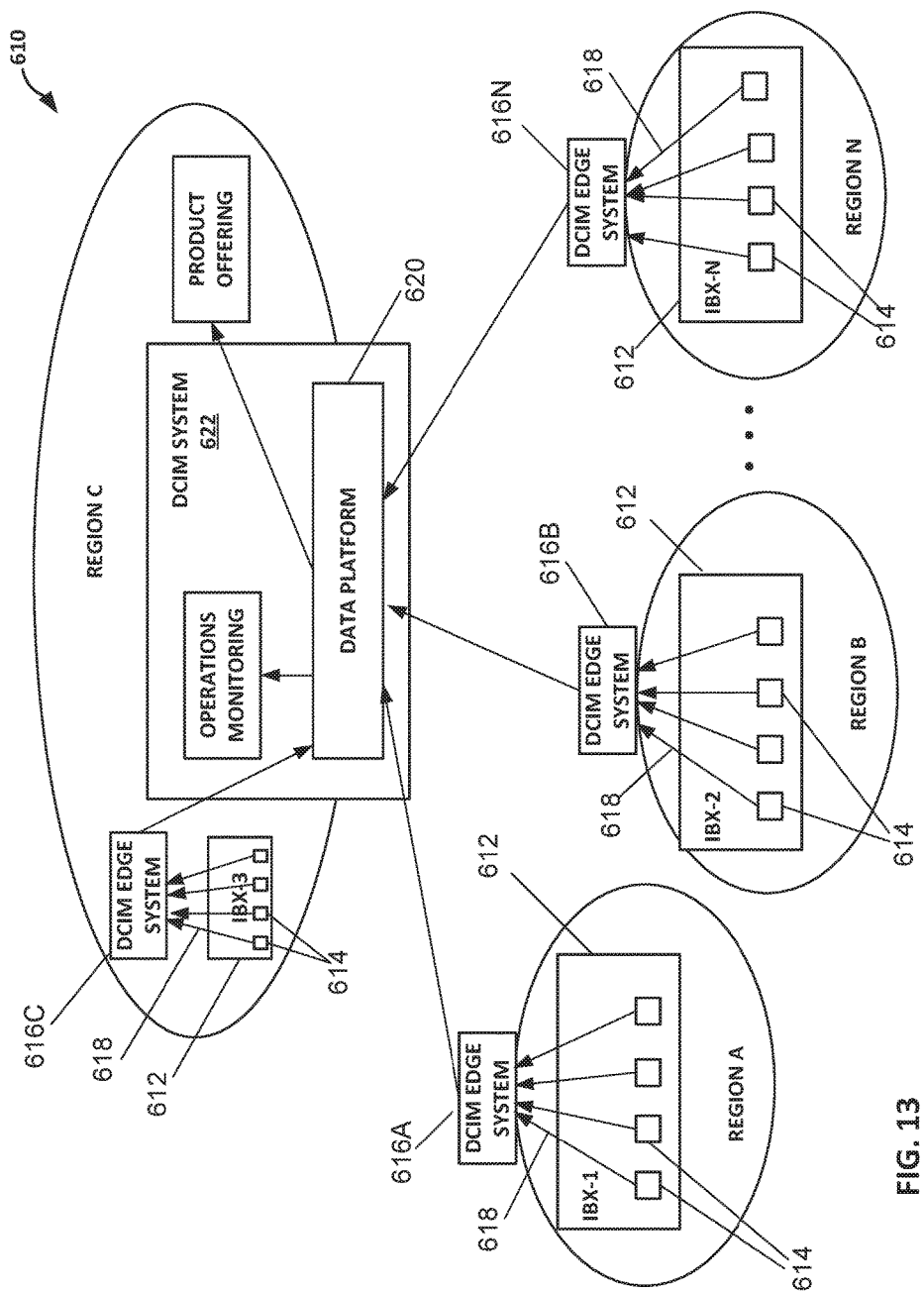
FIG. 13 is a block diagram illustrating an example system for data center infrastructure monitoring, in accordance with aspects of techniques described herein.

FIG. 13 is a block diagram illustrating an example system for data center infrastructure monitoring, in accordance with aspects of techniques described herein.

In some examples, IoT edge systems 14 of FIG. 1 may be data center infrastructure monitoring (DCIM) edge systems 616A-616N of FIG. 13. In the example of FIG. 13, DCIM edge systems 614 may transmit some IoT device data from the IoT edge systems (DCIM edge systems 614) to a central data platform of a central DCIM system 622 that processes and analyzes the data collected from the multiple DCIM edge systems 616A-616N. A DCIM system as shown in FIG. 13 is further described in U.S. Provisional Patent Application Ser. No. 62/336,300, filed May 13, 2016, and U.S. Provisional Patent Application Ser. No. 62/353,471 filed June 22, 2016, each of which are hereby incorporated by reference in their respective entireties.

In the example of FIG. 13, system 610 includes multiple data centers 612 (also referred to herein as "co-location facilities" or "international business exchanges (IBX1-IBX-N)"), with each of the data centers 612 being located at one or more geographically distributed locations. For example, the data center infrastructure monitoring system 610 may include multiple data centers 612 located within a single region of regions A-N, or may include multiple data centers 612 located within multiple regions A-N.

Each of the multiple data centers 612 located within a given region A-N include multiple physical infrastructure assets 614 that enable operation of a physical building and IT systems located within the data center 612. For example, the assets 614 may include physical structure related to power systems and cooling systems associated with controlling the environment within the data center 612, such as temperature sensors, HVAC (heating ventilation and air conditioning) units, CRAC (computer room air conditioning) units, uninterruptible power supplies (UPSs), generators, PDUs (power distribution units), AHUs (air handling units), switchgears, chillers and power units, for example. In some examples, assets 614 may include devices related to security, lighting, electrical, structural integrity, occupancy, or energy credits, for example. Each of the assets 614 are communicatively coupled to a corresponding one of data center infrastructure monitoring (DCIM) edge systems 616A-616N ("DCIM edge systems 616") via a connection 618. For example, each of the data centers 612 may communicate data associated with the assets 614 with the corresponding DCIM edge system 616 via one or more of a metro Ethernet network, the Internet, a mobile backhaul network, or a Multiprotocol Label Switching (MPLS) access network (not shown).

The DCIM system 622 provides data from data platform 620 to internal operations monitoring application(s), such as a Global IBX Monitoring System (GIMS), and/or one or more external customer-facing application product offerings, such as applications by which customers can view status of their data center assets (e.g., cages, cabinets, ports, patch panels, virtual circuits, or other assets).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples have been described. These and other examples are within the scope of the following examples.

What is claimed is:

1. A method comprising:
   selecting, by at least one of a plurality of edge computing systems co-located within respective co-location facilities each deployed and managed by a single co-location facility provider, a selected edge computing system of the plurality of edge computing systems to process data generated by an Internet of Things (IoT) device;
   provisioning, by the at least one of the plurality of edge computing systems, a proxy executing on one or more computing devices for processing the data at the selected edge computing system;
   provisioning, at a gateway device of the selected edge computing system, an application programming interface (API) endpoint associated with the proxy for communication with the IoT device;
   receiving, by the selected edge computing system at the API endpoint, the data generated by the IoT device; and
   processing, by the proxy of the selected edge computing system, the data generated by the IoT device and received at the API endpoint.

2. The method of claim 1, further comprising:
   by the proxy, filtering the data generated by the IoT device based on configured policies; and
   by the proxy, discarding a subset of the data generated by the IoT device without forwarding the subset of the data to a core processing system.

3. The method of claim 1, further comprising: by the proxy, performing network protocol translation on the data generated by the IoT device.

4. The method of claim 1, further comprising:
   establishing a communication channel between the IoT device and the API endpoint,
   wherein receiving comprises receiving, by the selected edge computing system at the API endpoint, the data generated by the IoT device via the communication channel.

5. The method of claim 1, wherein processing the data comprises routing, by the selected edge computing system, the data to a core processing system.

6. The method of claim 1, wherein selecting the selected edge computing system comprises selecting the selected edge computing system in response to an IoT device registration manager of one of the edge computing systems receiving a device registration request from the IoT device, the method further comprising: managing registration and authentication of the IoT device by the IoT device registration manager.

7. The method of claim 1, wherein selecting the selected edge computing system comprises selecting based on IoT device type and configured policies.

8. The method of claim 1, wherein selecting the selected edge computing system comprises selecting based on IoT device location and configured policies, wherein the second edge computing system is located geographically closest to the IoT device.

9. The method of claim 1,
   wherein processing the data comprises processing the data by a core processing center operated by the co-location provider.

10. The method of claim 1,
    wherein processing the data comprises processing the data by one or more computing devices of an enterprise associated with the IoT device.

11. The method of claim 1, wherein processing the data comprises processing the data by one or more computing devices of a cloud service provider.

12. A system comprising:
    a plurality of edge computing systems co-located within respective co-location facilities each deployed and managed by a single co-location facility provider, wherein at least one of the plurality of edge systems is configured to select a selected edge computing system of the plurality of edge computing systems to process data generated by an Internet of Things (IoT) device and provision a proxy on one or more computing devices for processing the data; and
    a gateway device of the selected edge computing system configured to provision an application programming interface (API) endpoint for communication with the IoT device, wherein the API endpoint is associated with the of the selected edge computing system, receive, at the API endpoint, the data generated by the IoT device, and process the data generated by the IoT device and received at the API endpoint.

13. The system of claim 12, wherein each of the edge computing systems comprises:
    an Internet of Things (IoT) device registration manager configured to manage registration and authentication of IoT devices;
    an IoT edge processor configured to provision application programming interface (API) endpoints for communication with the IoT devices; and
    an IoT edge configurator configured to process data generated by the IoT devices, wherein the data is received via the API endpoints.

14. The system of claim 12, wherein the proxy filters the data generated by the IoT devices based on configured policies, and discards a subset of the data generated by the IoT devices without forwarding the subset of the data to a core processing system.

15. The system of claim 12, wherein the selected edge computing system comprises:
    an IoT traffic analytics engine configured to provide information regarding a state of one or more of the computing devices of the proxy.

16. A computer-readable storage device comprising instructions that when executed cause one or more processors of an edge computing system to:

select the edge computing system, from among a plurality of edge computing systems co-located within respective co-location facilities each deployed and managed by a single co-location facility provider, to process data generated by an Internet of Things (IoT) device;

provision a proxy executing on one or more computing devices of the edge computing system for processing the data at the selected edge computing system;

provision an application programming interface (API) endpoint associated with the proxy at a gateway device of the edge computing system for communication with the IoT device;

receive at the API endpoint the data generated by the IoT device; and process, by the proxy of the edge computing system, the data generated by the IoT device and received at the API endpoint.

* * * * *

UNITED STATES PATENT AND TRADEMARK OFFICE
CERTIFICATE OF CORRECTION

PATENT NO. : 10,230,798 B2  
APPLICATION NO. : 15/863565  
DATED : March 12, 2019  
INVENTOR(S) : Vijaay Doraiswamy et al.

Page 1 of 1

It is certified that error appears in the above-identified patent and that said Letters Patent is hereby corrected as shown below:

In the Claims

Column 20, Lines 39-40 (Claim 12) Replace "with the of the selected edge computing system" with --with the proxy of the selected edge computing system--

Signed and Sealed this  
Fourteenth Day of September, 2021

Drew Hirshfeld  
*Performing the Functions and Duties of the*  
*Under Secretary of Commerce for Intellectual Property and*  
*Director of the United States Patent and Trademark Office*